United States Patent [19]
Araujo et al.

[11] Patent Number: 6,112,245
[45] Date of Patent: Aug. 29, 2000

[54] SESSION ESTABLISHMENT FOR STATIC LINKS IN POINT-TO-POINT PROTOCOL SESSIONS

[75] Inventors: Kenneth Araujo, Sunnyvale; Peter Si-Sheng Wang, Cupertino, both of Calif.

[73] Assignee: 3Com Corporation, Santa Clara, Calif.

[21] Appl. No.: 09/056,258

[22] Filed: Apr. 7, 1998

[51] Int. Cl.[7] .................................................. G06F 15/16
[52] U.S. Cl. .......................... 709/228; 709/227; 709/236; 709/238; 709/245
[58] Field of Search ........................... 709/203, 271–219, 709/227–232, 250, 236, 238, 245

[56] References Cited

U.S. PATENT DOCUMENTS

| | | | |
|---|---|---|---|
| 4,965,798 | 10/1990 | Mostafa et al. | 370/79 |
| 5,563,882 | 10/1996 | Bruno et al. | 370/62 |
| 5,583,997 | 12/1996 | Hart | 395/200.15 |
| 5,657,452 | 8/1997 | Kralowetz et al. | 709/227 |
| 5,680,392 | 10/1997 | Semaan | 370/261 |
| 5,732,071 | 3/1998 | Saito et al. | 370/255 |
| 5,745,884 | 4/1998 | Carnegie et al. | 705/34 |
| 5,768,525 | 6/1998 | Kralowetz et al. | 709/228 |
| 5,818,838 | 10/1998 | Backes et al. | 370/390 |
| 5,822,523 | 10/1998 | Rothschild et al. | 395/200.17 |
| 5,867,660 | 2/1999 | Schmidt et al. | 395/200.57 |
| 5,870,386 | 2/1999 | Perlman et al. | 370/256 |
| 5,918,019 | 6/1999 | Valencia | 709/227 |

OTHER PUBLICATIONS

W. Simpson, Ed., "RFC 1662: PPP in HDLC–like Framing" Jul. 1994.

Arunkumar, N. et al., "Layer Two Tunneling Protocol (L2TP) over AAL5 and FUNI", 3Com Corporation, Mar. 25, 1997, printed from world wide web site "http://www.internic.net/internet–drafts/draft–ietf–pppext–12tp–aa15–funi–00.txt", 11 pages.

Simpson, W. (Editor), "PPP in HDLC–like Framing", Request for Comments 1662, Point–to–Point Protocol Working Group of the Internet Engineering Task Force (IETF), Jul. 1994, printed from world wide web site "http://ds.internic.net/rfc/rfc1662.txt", 53 pages.

Hamzeh, K. et al., "Layer Two Tunneling Protocol 'L2TP", Nov. 1997, printed from world wide web site "http://www.internic.net/internet–drafts/draft–ietf–pppext–12tp– 08.txt", 132 pages.

Simpson, W. (Editor), "The Point–to–Point Protocol (PPP)", Request for Comments 1661, Point–to–Point Protocol Working Group of the Internet Engineering Task Force (IETF), Jul. 1994, printed from world wide web site "http://ds.internic.net/rfc/rfc1661.txt", 108 pages.

*Primary Examiner*—Zarni Maung
*Assistant Examiner*—Saleh Najjar
*Attorney, Agent, or Firm*—David J. Weitz; Wilson Sonsini; Goodrich & Rosati

[57] ABSTRACT

A constant access ADSL link, or an equivalent connection from a modem to a central office switch is enabled to establish sessions to individual end stations, such as individual Internet service providers. An in-band signaling channel within the Point-to-Point Protocol session employs a connection establishment and tear down protocol for session establishment and tear down to individual end stations with the end station coupled to the ADSL link. Such session establishment and tear down messages are associated with frames having an HDLC-like address of (hex)FF are terminated locally by the concentration/multiplexing equipment at the central office switch or other equipment provided by the telephone network access provider. As a result the session establishment, the access provider's concentration/multiplexing equipment returns a value other than (hex)FF to be used by the end station coupled to the ADSL link, in the HDLC address field to identify data associated with the particular PPP session. This HDLC address value will only have local significance across the ADSL link between the customer premises equipment and the access provider's concentration/multiplexing equipment. When PPP frames associated with the particular session are received from an ISP, the frames are encapsulated in HDLC-like frames with the HDLC address associated with the session by the access provider's equipment before deliver across the ADSL link.

24 Claims, 4 Drawing Sheets

SESSION ESTABLISHMENT FOR STATIC LINKS IN POINT-TO-POINT PROTOCOL SESSIONS

RELATED APPLICATIONS

This application is related to non-provisional application, entitled "Point-to-Point Protocol With A Signaling Channel," by inventors, Kenneth Araujo and Peter Si-Sheng Wang, having Ser. No. 09/056,280, and filing date Apr. 7, 1998, which was filed on the same day as the instant application; and to non-provisional application, entitled "Distribution Of Protocol Processes From Network Elements To End Stations," by inventors, Kenneth Araujo, Peter Si-Sheng Wang and Cheng Chen having Ser. No. 09/056,281, and filing date Apr. 7, 1998, which was filed on the same day as the instant application; and to non-provisional application, entitled "Enabling Multicast Distribution Efficiencies In A Dialup Access Environment," by inventors Kenneth Araujo, Peter Si-Sheng and Cyndi Jung having Ser. No. 09/056,284, and filing date Apr. 7, 1998, which was filed on the same day as the instant application.

BACKGROUND OF THE INVENTION

1. Field of the Invention

The present invention relates to data communications, and more particularly to techniques for improving the flexibility and useability of point-to-point communication protocols, such as the Point-to-Point Protocol (PPP), for static link modems, such as Asynchronous Digital Subscriber Loop ADSL modems.

2. Description of Related Art

The Point-to-Point Protocol, as it is defined, is used for transporting multi-protocol datagrams over point-to-point links. One version of the PPP is described in Request For Comments RFC 1661, published July 1994 by the Point-to-Point Protocol Working Group of the Internet Engineering Task Force IETF. The PPP consists of a specification for encapsulating multi-protocol datagrams, a link control protocol LCP for establishing, configuring and testing the datalink connection, and a family of network control protocols NCPs for establishing and configuring different network layer protocols. According to the PPP, network layer packets are referred to as datagrams. The datagrams are passed to the datalink layer in which they are encapsulated according to the PPP in a packet having a packet header. The packet including the PPP fields and the datagram is passed to the physical layer at which framing such as HDLC-like framing is appended to form a frame in the format received at the physical layer interface. So called HDLC-like framing is described in "PPP in HDLC-like Framing" RFC 1662 published July 1994 by the Point-to-Point Protocol Working Group of the IETF. Upon reception, the frame is stripped of its framing fields, and a packet is passed to the datalink layer. The packet is stripped of its control fields to produce a datagram. The datagram is passed to the network layer at which network layer headers and the like are processed. Use of the PPP provides a simple technique for encapsulating data from a variety of protocols and is used for example across telephone lines between end stations and Internet access providers.

PPP sessions are established between peers. In one typical environment, the peers include equipment located at a customer site referred to as customer premises equipment CPE, and a remote access server RAS operated by an Internet Service Provider ISP. The customer typically dials a telephone number to access the RAS of the Internet Service Provider. For some modem types, such as the asynchronous digital subscriber loop ADSL (running PPP in HDLC framing over ADSL), the CPE has a static link to a RAS, without requiring dial up. In this case the central office switch is statically configured to direct ADSL traffic from a particular modem to a particular destination, such as a remote access server for an Internet Service Provider. The PPP is utilized to establish the peer to peer connection from the CPE to the RAS.

Thus, when a CPE is connected via ADSL to a central office switch and uses a protocol, such as the PPP over HDLC-like framing, without out-of-band session establishment, the user is limited to a single peer connection. Alternatively more, complex protocols, such as PPP over ATM on an ADSL link, provide a capability to set up more than one connection through the ATM procedures. However, it is desirable to provide this capability on simpler protocols.

SUMMARY OF THE INVENTION

According to the present invention, a technique is provided by which a constant access ADSL link, or an equivalent connection from a modem to a central office switch is enabled to establish sessions to individual end stations, such as individual Internet service providers. In particular, the invention applies an in-band signaling channel within the Point-to-Point Protocol session. The new PPP signaling channel employs a connection establishment and tear down protocol for session establishment and tear down to individual end stations with the end station coupled to the ADSL link. Such session establishment and tear down messages are associated with frames having an HDLC-like address of (hex)FF, and are terminated locally by the concentration/multiplexing equipment at the central office switch or other equipment provided by the telephone network access provider. Thus, such frames are used to provide local management in network intermediate devices for PPP sessions. As a result the session establishment, the access provider's concentration/multiplexing equipment returns a value other than (hex)FF to be used by the end station coupled to the ADSL link, in the HDLC address field to identify data associated with the particular PPP session. This HDLC address value will only have local significance across the ADSL link between the customer premises equipment and the access provider's concentration/multiplexing equipment. When PPP frames associated with the particular session are received from an ISP, the frames are encapsulated in HDLC-like frames with the HDLC address associated with the session by the access provider's equipment before delivery across the ADSL link. PPP data is extracted from frames received from the CPE, and the value of the HDLC address field in such frames is used to determine where the data should be forwarded. For cases where the CPE does not support the new PPP signaling channel, the access equipment will not continue attempting to establish/communicate via the new signaling channel with the CPE over frames which have an HDLC address of (hex)FF.

The protocol employed in the signaling channel associated with HDLC address (hex)FF includes messages (used as examples; other messages with equivalent functionality could also be used), such as the following:

1. An ESTABLISH_SESSION_REQUEST message, used to request that a session be established to a particular end point. Included in the message would be an address of the end point, traffic parameters, quality of service parameters, and other channel related information.

2. An ESTABLISH_SESSION_REPLY message, sent in response to a previous ESTABLISH_SESSION_REQUEST message. If a positive response is received, the reply returns a session identifier to be used as the HDLC address in frames carrying data associated with this particular session. A negative response means that the ESTABLISH_SESSION_REQLEST failed.

3. A TEARDOWN_SESSION_REQUEST message, used to request that an existing session be torn down. This message carries the session ID.

4. A TEARDOWN_SESSION_REPLY message, sent in response to a previous TEARDOWN_SESSION_REQUEST message. This message signifies that a previous session has been successfully torn down.

The present invention can be characterized as a method operating in a system that includes a network having one or more intermediate devices, such as concentration/multiplexing equipment, coupled to end stations by respective links. The first end station is coupled across a link, such as an ADSL link, through a first intermediate device, such as an access provider's central office switch to the network. The method enables the first end station to establish point-to-point sessions according to a communication protocol such as the PPP to more than one other end station. The method comprises establishing a point-to-point session with a second end station according to the communication protocol. The establishment of the point-to-point session is done for example in response to an ESTABLISH_SESSION_REQUEST message from the first end station to the intermediate device. Next, the first intermediate device transmits information to the first end station identifying the session in a data frame formatted according to the communication protocol, so that the first end station is enabled to include a session identifier in data frames on the link formatted according to the communication protocol. Thus, the intermediate device sends a frame such as PPP frame to the first end station that carries in-band the session identifier for the point-to-point session which has been established with the second end station. At the intermediate device, data frames are detected on the link which are formatted according to the communication protocol of the session and which include the session identifier. Data from the data frames that include the session identifier is forwarded via a connection (logical and/or physical) to the second end station.

The step of transmitting information identifying the session according to one aspect of the invention includes providing a data frame that has a reserved field according to the communication protocol. The data frame sent from the intermediate device to the end station carries an indicator in the reserved field that the data frame includes the session identifier. The reserved field according to PPP implementation comprises for example the protocol field that is specified for PPP protocol identification functions. The vessel field could be something general like "signaling". Other following fields when processed, would indicate the signaling message involved as well as the associated parameters.

Also according to a PPP implementation, the data frames comprise HDLC-like framing fields that include an address field normally carrying a constant value, (hex)FF for frames on the ADSL link. The session identifier comprises a code in the address field on the link to the first end station from the intermediate device.

The method is extendable to more than one session. Thus, invention can be characterized as further including establishing a second point-to-point session with a third end station according to the communication protocol. The first intermediate device transmits information identifying the second session in a data frame formatted according to the communication protocol to the first end station. This enables the first end station to include a session identifier for the second session in data frames on the link. The first intermediate device detects data frames on the link that are formatted according to the communication protocol and include the second session identifier. Data from the data frames which include the second session identifier is forwarded via a connection (logical and/or physical) to the third end station.

The invention can also be characterized from the point-of-view of the end station. According to this aspect of the invention, the method includes signaling on the link the first intermediate device to setup a point-to-point session for carrying data frames formatted according to the communication protocol between the first end station and a second end station. At the first end station, a data frame is received from the first intermediate device including a session identifier for the session. Data frames formatted according to the communication protocol destined to the second end station are sent including the session identifier to enable the first intermediate device to forward the data from the data frame to the second end station in the session. As before, the signaling step involves providing a data frame including an indicator in a reserved field that the data frame includes a request to establish a session. According to one aspect of the invention, the reserved field comprises a protocol field specialized for PPP protocol identification functions. In one example, the protocol field indicates signaling in general, and passing following data fields is required to indicate the request to establish a session, and related parameters.

Furthermore, in another aspect of the invention, the session identifier in the step of sending comprises a code in a framing field of the frame. For example, the session identifier comprises a unique address in an address field normally carrying a constant value for frames on link, when the link comprises an HDLC-like framing link.

Accordingly, the present invention provides a technique for providing in-band session establishment for simple protocol such as PPP over ADSL, using HDLC-like framing.

Other aspects and advantages of the present invention can be seen upon review of the figures, the detailed description, and the claims which follow.

DETAILED DESCRIPTION

Figure 1:
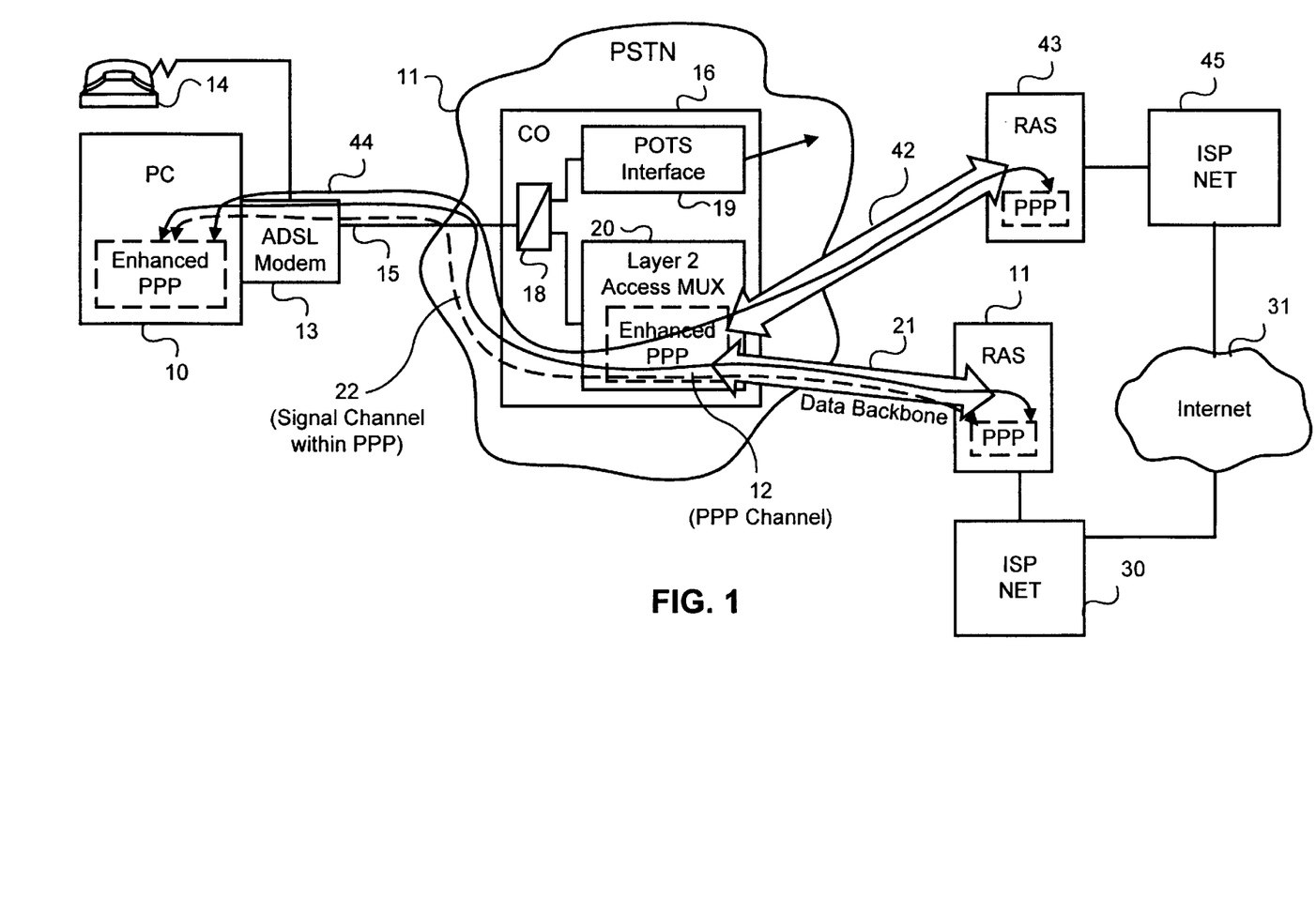
FIG. 1 is a simplified diagram of an example network environment in which enhanced point-to-point protocol of the present invention is implemented.

A detailed description of examples of the present invention is provided with reference to the figures, in which FIG. 1 illustrates a context in which the present invention is used.

FIG. 1 illustrates a point-to-point connection between peer end stations, in this example a personal computer 10 and a remote access server 11. The point-to-point communication session in this example is represented by the arrow 12 established according to the point-to-point protocol PPP. The personal computer 10 includes a modem 13, which in a preferred embodiment is a high throughput modem such as an asynchronous digital subscriber loop ADSL modem. The modem 13 is connected to a telephone line which can be shared with a standard telephone equipment 14. Alternatively, there could be a splitter that terminates the telephone line. One port is used for the telephone, the other port is used for the ADSL modem. The modem 13 is connected by a local loop medium such as link 15 to a central office switch 16 in the public switched telephone network PSTN represented by the cloud 17. The central office switch 16 includes a splitter 18 by which data traffic is split, physically or logically, from voice traffic. The voice traffic is supplied to an interface for voice traffic through the network 17 such as a POTS (plain old telephone service) interface 19. Data traffic is routed from splitter 18 to an access multiplexer 20 for connection to a data network managed by the telephone access provider. Alternatively, the access multiplexer could terminate the ADSL line. In its line card, it could include the functionality of the splitter. Interfaces out of the access multiplexer could contain several voice streams multiplexed together for delivery to the PSTN network. Similarly, one or more interfaces from the access multiplexer would allow for connectivity to the data network.

Typically the access multiplexer 20 operates at layer 2 of the network protocol stack, or otherwise operates as a network intermediate device. The access multiplexer 20 provides an edge device for a channel 21 through a data backbone network which is coupled to the remote access server 11. The point-to-point session 12 is established from the personal computer 10 through the splitter 18 and access multiplexer 20, across the channel 21, such as an ATM virtual circuit, to the remote access server 11. The remote access server 11 in this example is coupled to an Internet service provider network 30, which includes for example a server "farm". The Internet service provider network is in turn coupled to the Internet 31.

According to the present invention, the access multiplexer 20 also provides an edge device for a channel 41 through a channel 42 through a data backbone network which is coupled to the second remote access server 43. A second point-to-point session 44 is established from the personal computer 10 through the splitter 18 and access multiplexer 20, across the channel 42, such as an ATM virtual circuit, to the second remote access server 43. The remote access server 43 in this example is coupled to a second Internet service provider network 45, which includes for example a server "farm". The Internet service provider network is in turn coupled to the Internet 31.

The personal computer includes an enhanced point-to-point protocol module according to the present invention. Also the access multiplexer 20 includes an enhanced point-to-point protocol processing module to handle the signaling channel according to the present invention. The remote access server 11 includes a point-to-point protocol module (preferably but not necessarily enhanced according to the present invention) and operates as the end point, or peer, for the point-to-point session 12. According to the present invention, a signaling channel within the point-to-point protocol session is included, represented by the dashed line 22. The access multiplexer will continuously monitor for point-to-point frames (prior to establishment of the point-to-point session, during establishment of the point-to-point session, and upon establishment of the point-to-point session). For example, for the PPP-ATM-ADSL case, this monitoring could start once the CONNECT message was sent from the access mulitplexer to the CPE. Point-to-point protocol frames carrying a code indicating that they are signaling channel frames are then processed in the enhanced PPP module in the access multiplexer 20.

The signaling channel is identified by a particular value or values in the protocol field of the standard PPP encapsulation, in a preferred example. Alternatively or in combination, other fields, such as the address field of the HDLC-like framing standard for PPP packets are used to identify signaling channel frames. The signaling channel can be used to achieve a number of functions referred to as edge functions, that are relevant to assisting the access multiplexer 20 in the management of network traffic. According to the present invention, for cases where the point-to-point link is used over static, constant access links such as ADSL, and in which the accompanying protocol stack has no signaling mechanism for out-of-band session establishment, the signaling channel, as an in-band part of the PPP, is used for setup of individual sessions to different ISPs or other peers.

The environment of FIG. 1 is a simplified depiction. In some environments, the remote access servers 11, 43 are also coupled to the PSTN 17 through a central office switch. Also, the access multiplexing functions executed by the access multiplexer 20 and the data backbone 21 are implemented in some networks between intermediate devices other than central office switches to concentrate traffic over high bandwidth links within the PSTN, which may not be directly coupled to a central office switch. For example, the intermediate device at which the signaling channel is processed may be a router or an ATM switch located in the access provider network. Data from several access multiplexers may be aggregated in the intermediate device which processes the signaling channel.

Figure 2:
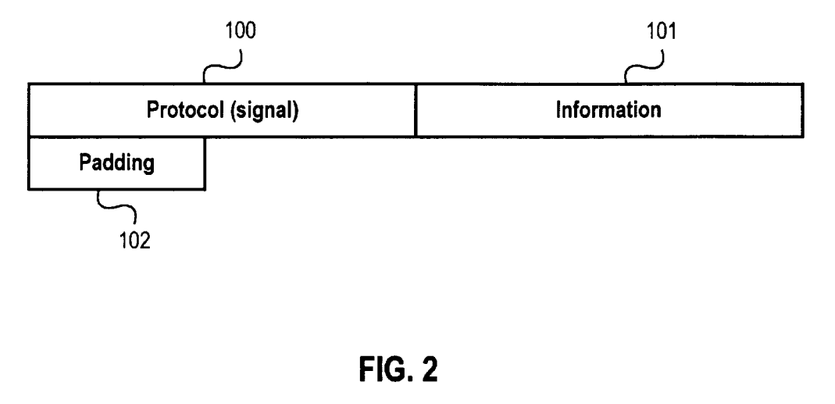
FIG. 2 is a diagram of a packet formatted according to the point-to-point protocol enhanced according to the present invention.

In a PPP session, packets are formatted according to specifications defining the fields shown in FIG. 2. The Protocol field 100 is one or two octets, and its value identifies the datagram encapsulated in the Information field 101 of the packet. For example, if the Protocol field has a value indicating IP, the Information field will contain an IP packet. The Protocol can have other defined values. For example, there is a value indicating a Link Control Protocol (LCP) frame. Such a packet is used by the end points of the PPP session, to agree upon encapsulation format options, handle varying limits on sizes of packets, etc.

The Information field 101 is zero or more octets. The Information field 101 contains the datagram for the protocol specified in the Protocol field 100. The maximum length for the Information field 101, including Padding 102, but not including the Protocol field 100, is termed the Maximum Receive Unit (MRU), which defaults to 1500 octets. By negotiation, consenting PPP implementations may use other values for the MRU.

Figure 3:
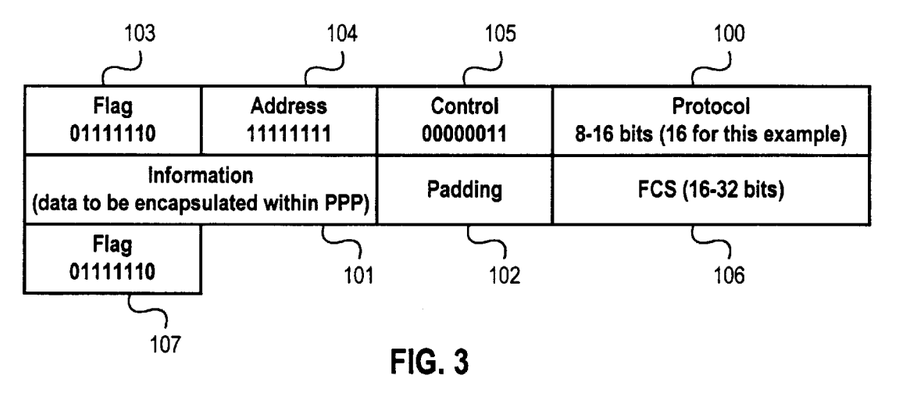
FIG. 3 is a diagram of a frame formatting accorded to the HDLC-like framing over the point-to-point protocol.

When sending the PPP packet as shown in FIG. 2 over an ADSL link, which is a bit-synchronous link, the PPP packet is encapsulated within an HDLC frame as shown in FIG. 3. The Protocol, Information, and Padding fields shown in FIG. 3 are the PPP fields that were described in FIG. 2.

FIG. 3 shows the encapsulation of PPP within HDLC framing. An HDLC frame is started by a flag sequence 103 of '01111110' binary. It is followed by an Address field 104;

the only defined value according to the standard that the Address field can have is '11111111' binary. Following the Address field 104 is a Control field 105 with a value of '00000011' binary. Following the Control 105 field are the PPP Protocol field 100, the PPP Information field 101, and the PPP Padding 102. This is followed by a Frame Check Sequence 106 for the HDLC frame which can be 16 bits or 32 bits. Finally, the HDLC frame is terminated by a closing Flag sequence 107 of '01111110' binary.

Frames belonging to the signaling channel will be identified via a special value, presently not assigned for other uses, of the Protocol field within the PPP encapsulation shown in FIG. 2. For example, a Protocol Field of 16 bits with a value of '1001000000000001' binary could be used to identify a PPP frame associated with the signaling channel.

According to the present invention, the access multiplexer 20 includes resources for identifying PPP frames such as those illustrated in FIGS. 2–3 which carry a signaling protocol value in the protocol field. Such resources include, hardware comparators which compare data at a specific offset within each frame to one or more hard coded values, software resources which perform the comparison function, and combinations of hardware and software. Hardware comparators are preferred in systems requiring fast decisions, or in systems having low processing resources. Software comparison techniques provide greater flexibility and other advantages. In addition to resources for recognizing frames which are part of the signaling channel, the access multiplexer 20 includes an enhanced PPP module that performs the functions specified by this signaling channel frames.

Figure 4:
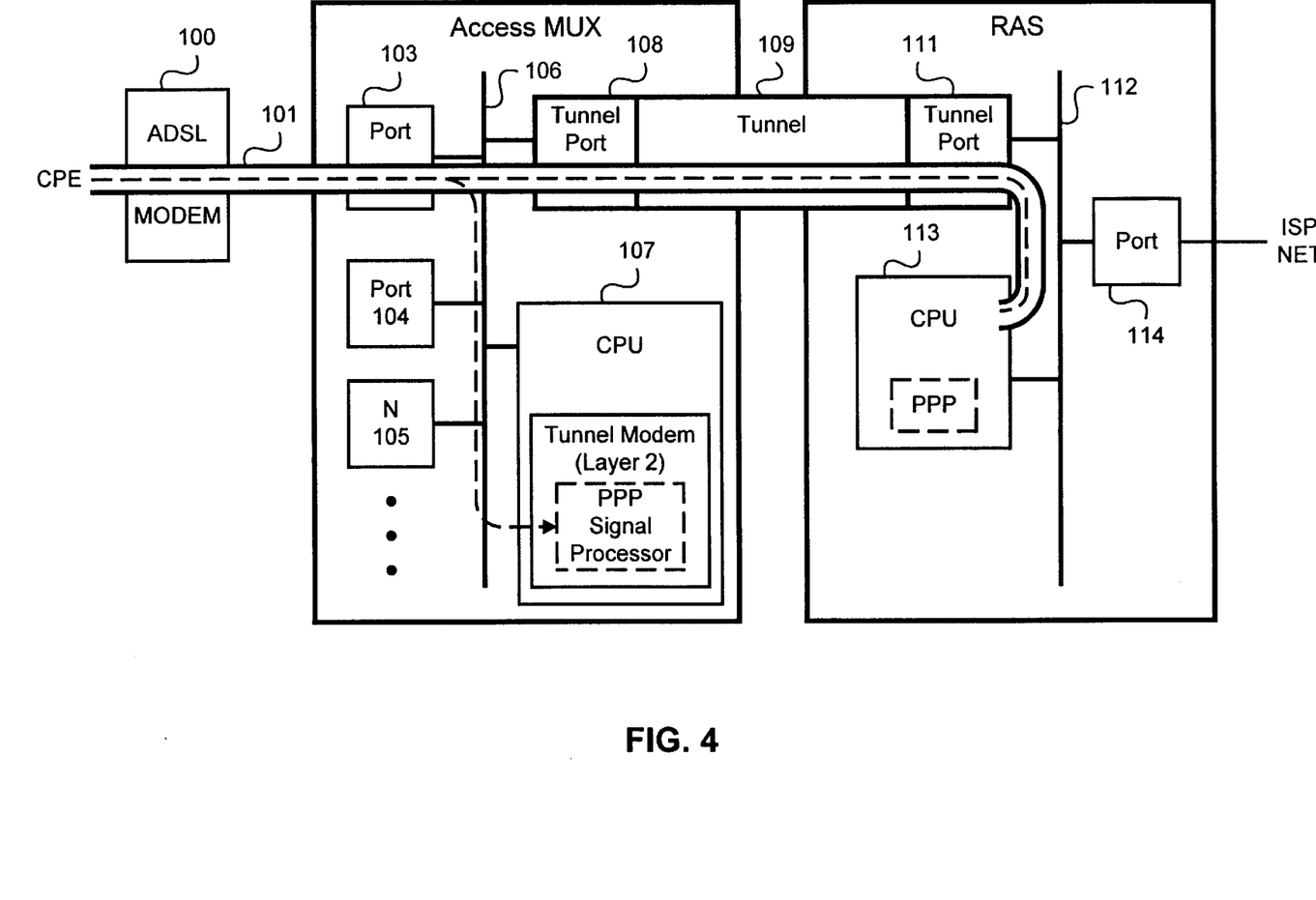
FIG. 4 is a more detailed diagram of an example of a point-to-point communication channel including a signaling channel according to the present invention, where the point-to-point communication channel is established between customer premises equipment CPE and remote access server RAS.

FIG. 4 is representative of one example implementation of an access multiplexer and a remote access server according to the present invention. In FIG. 4, an ADSL modem is coupled to customer premises equipment CPE as an end point of a point-to-point session 101. The point-to-point session 101 is established through an access multiplexer 102. The access multiplexer 102 includes a port 103 for communication with the modem 100. Also, a plurality of other ports may be included in the access multiplexer 102 such as ports 104 and 105. The ports 103–105 are coupled to a bus 106. A central processing unit 107 is coupled to the bus 106. The central processing unit 107 includes tunnel management resources for layer 2 tunneling and a point-to-point protocol signal channel processor. Also coupled to the bus 106 is a port 108 for connection across a backbone communication channel, such as a layer 2 tunnel protocol L2TP tunnel 109. The CPU 107 monitors frames received on port 103 and performs edge functions for transferring the frames through the tunnel 109 to the destination, such as a remote access server 110. The remote access server includes a tunnel port 111, which is coupled to a backbone bus 112. The backbone bus is coupled to a central processing unit 113 in the remote access server which includes a point-to-point protocol module. Also, the remote access server 110 includes a port 114 for connection to a local network, such as an Internet service provider network.

The ports 103–105 include filters for recognizing signaling channel frames and signaling the CPU 107 that PPP signaling processing is required. Alternatively, frames received on ports 103–105 are monitored by software executed by the CPU 107 for edge processing and for PPP signal channel processing.

The protocol stack PPP-ADSL stack contains no means for setting up individual sessions to different ISPs, and identifying via different encapsulation the data that is destined for a particular ISP. With the definition of the signaling channel, the access equipment is allowed to interact with CPE to determine the ISP that a user wishes to use for a particular session, and to allocate a unique value for the HDLC address field or other framing field that could be used by the CPE to encapsulate data for this session. Note that different PPP sessions to different ISPs each have their own associated signaling channel to realize advantages described earlier. The unique HDLC address is used by the access provider's concentration/multiplexing equipment for fast forwarding to the ISP that the data is destined for.

Figure 5:
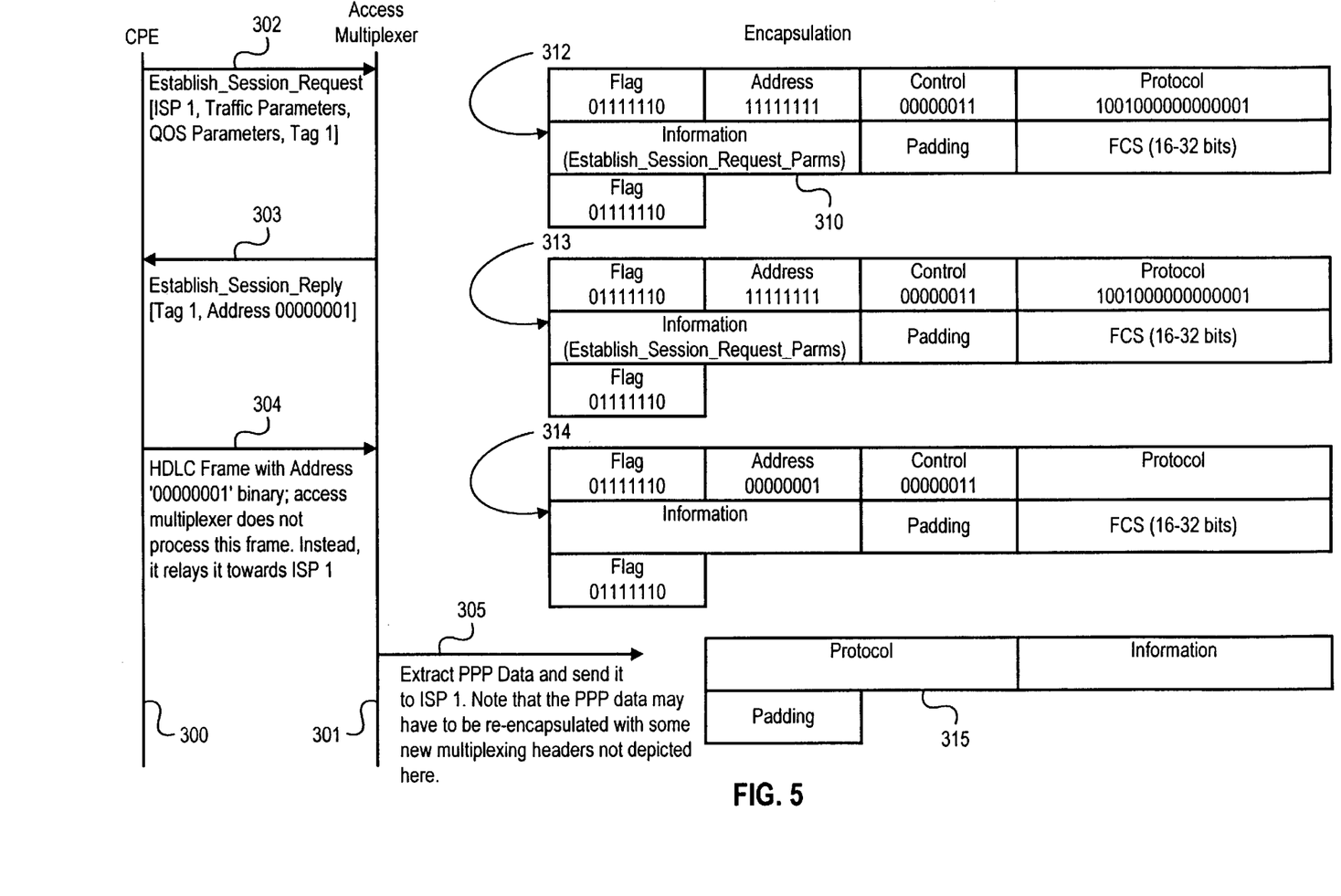
FIG. 5 illustrates the process of establishing a session to an Internet Service Provider for a static link environment.

Suppose the Customer Premises Equipment (CPE) wishes to establish a session to Internet Service Provider 1 (ISP 1). First, the CPE could go through the normal LCP negotiation with the Access Multiplexer. This LCP negotiation is used to automatically agree upon the encapsulation format options, handle varying limits on sizes of packets, detect a looped-back link and other common misconfiguration errors, and terminate the link. It would then follow the sequence of steps shown in the stick diagram in FIG. 5. In FIG. 5, the stick diagram shows the high level view of the exchanges occurring between the CPE 300 and the Access Multiplexer 301. The Encapsulation part to the right of the stick diagram provides an example encoding of the HDLC frames exchanged between the CPE 300 and the Access Multiplexer 301 and the PPP frames exchanged between the Access Multiplexer 301 and the Remote Access Server (RAS) of some ISP.

First, the CPE 300 sends an Establish_Session_Request 302 to the Access Multiplexer 301, requesting that a session be established to ISP 1. Included in this request is a Tag parameter (e.g. in Information field 310) so that the CPE can match a response from the access multiplexer to this request via the Tag. Also included is the Name and/or Address of the ISP, and other pertinent information relevant to the session to the particular ISP—for example, the Quality of Service (QOS) required for the session, and the bandwidth requirements for the session. The encapsulation 312 for the Establish_Session_Request comprises an HDLC Frame with an Address of '11111111' and has the Protocol field set to the value used for the Signaling Channel.

On receipt of the Establish_Session_Request 302, the Access Multiplexer 301 on seeing that a frame with an Address of '11111111' with a Protocol field indicating the Signaling Channel has been received, knows that it needs to process the frame. It processes the frame and determines that the CPE is trying to establish a new session to ISP 1. It checks to see if it can provide the session to ISP 1 at the required traffic parameter specifications and the requires QOS. If necessary, it may need to establish a new connection to ISP 1. If everything goes fine, it returns an Establish_Session_Reply 303 to the CPE indicating that the request can be met, encapsulated as shown at 313. It informs the CPE that future PPP data associated with this session to ISP 1 should be encapsulated within HDLC frames with an Address field of '00000001' binary. (If the session could not be established for some reason, the Access Multiplexer would return a negative response to the Establish_Session_Request.)

Future PPP data 304 for ISP 1 will be encapsulated within HDLC frames 314 with an Address field of '00000001' binary. When the Access Multiplexer 301 receives frames with such an address field, it immediately extracts PPP packet 315 and forwards it onwards on a connection to ISP 1.

If the CPE now wants to establish a second session, this time to ISP 2, it will go through the session establishment procedure again, this time using ISP 2's Name and Address in the Establish_Session_Request 302. If this new session can be established, the Access Multiplexer 301 will return 303 a unique value to be used for the Address field of HDLC frames that contain PPP data destined for ISP 2. For example, it could return a value of '00000010' binary. Now, whenever the Access Multiplexer 301 receives HDLC frames 304 with an Address field of '00000001' binary, it will extract the data and relay it to ISP 1. When it receives HDLC frames with an Address field of '00000010' binary, it will extract the data and relay it to ISP 2.

In the opposite direction, PPP data from ISP 1 received by the Access Multiplexer over a connection (physical and/or logical) associated with the first PPP session with CPE 300 will be encapsulated into HDLC frames with an Address field of '00000001' before being relayed to the CPE. Similarly, PPP data from ISP 2 received by the Access Multiplexer over a connection (physical and/or logical) associated with teh second PPP session with CPE 300 will be encapsulated into HDLC frames with an Address field of '00000010' before being relayed to the CPE.

Accordingly, the present invention provides an extension to the point-to-point protocol that allows for interactions between end points of the point-to-point session and intermediate network devices involved in the transfer of data between the end points. The channel is used to relieve congestion in the intermediate devices that arise due to edge function like protocol processing, multicast distribution, limited user visibility behind a NAT and the inability to dynamically select an Internet service provider or other end point for ADSL or related links.

The foregoing description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. In a system including a network having one or more intermediate devices coupled to end stations by respective links, including a first end station coupled across a link through a first intermediate device to the network, a method for enabling the first end station to establish point-to-point sessions according to a communication protocol to more than one other end station, comprising:

establishing a point-to-point session with a second end station according to the communication protocol;

transmitting from the first intermediate device to the first end station, information identifying the session in a data frame formatted according to the communication protocol, the data frame including a reserved field, so that the first end station is enabled to include a session identifier in the reserved field of respective data frames on the link formatted according to the communication protocol;

detecting in the first intermediate device data frames on the link formatted according to the communication protocol, and including the session identifier; and forwarding data from said data frames including the session identifier in the session to the second end station.

2. The method of claim 1, wherein the communication protocol comprises a Point-to-Point Protocol PPP.

3. The method of claim 2, wherein the reserved field comprises a protocol field specified for PPP protocol identification functions.

4. The method of claim 2, wherein the reserved field comprises a protocol field specified for PPP protocol identification functions, carrying a signaling channel code and a following field carrying the session identifier.

5. The method of claim 1, wherein data frames formatted according to the communication protocol include a framing field, and the framing field comprises the reserved field, and the session identifier comprises a code in the framing field.

6. The method of claim 4, wherein the data frames comprise HDLC-like framing fields including an address field normally carrying a constant value for frames on the link, and the address field comprises the reserved field, and wherein the session identifier comprises a code in the address field.

7. The method of claim 1, wherein the communication protocol comprises a Point-to-Point Protocol PPP, and the data frames comprise HDLC-like framing fields including an address field normally carrying a constant value for all frames on the static link, and the address field comprises the reserved field, and said transmitting includes sending a data frame from the intermediate device to the end station including an indicator in a protocol field specified for PPP protocol identification functions that the frame carries a session identifier, and wherein in said detecting step the session identifier comprises a code in the address field.

8. The method of claim 1, further including:

establishing a second point-to-point session with a third end station according to the communication protocol;

transmitting from the first intermediate device to the first end station information identifying the second session in a data frame formatted according to the communication protocol, so that the first end station is enabled to include a second session identifier in data frames on the link formatted according to the communication protocol;

detecting in the first intermediate device data frames on the link formatted according to the communication protocol, and including the second session identifier; and forwarding data from said data frames including the second session identifier in the session to the third end station.

9. The method of claim 1, wherein the establishing includes detecting a signal from the first end station, and in response initiating set up processes for establishing the session.

10. The method of claim 9, wherein the signal from the first end station comprises a code in a reserved field of a data frame formatted according to the communication protocol.

11. The method of claim 10, wherein the communication protocol comprises a Point-to-Point PPP, and the reserved field comprises a protocol field specified for PPP protocol identification functions, carrying a signaling channel code and a following field carrying the session identifier.

12. In a system including a network having one or more intermediate devices coupled to end stations by respective links, including a first end station coupled across an asynchronous digital subscriber loop ADSL link through a first intermediate device to the network, a method for enabling the first end station to establish point-to-point sessions according to a Point-to-Point Protocol PPP to more than one other end station, comprising:

establishing a PPP session with a second end station according to the PPP;

transmitting from the first intermediate device to the first end station, information in a data frame comprising HDLC-like framing fields with an address field normally carrying a constant value for frames on the ADSL link, the data frame including a signaling indicator in a protocol field specified for PPP protocol identification functions and additional data indicating that the data frame carries a session identifier identifying the session, so that the first end station is enabled to include a session identifier in the address field of data frames on the ADSL link formatted according to the PPP;

detecting in the first intermediate device data frames on the ADSL link formatted according to the PPP, comprising a code in the address field corresponding to the session identifier; and forwarding data from said data frames including the session identifier in the session to the second end station.

13. The method of claim 12, including:

establishing a second PPP session with a third end station according to the PPP;

transmitting from the first intermediate device to the first end station, information in a data frame comprising HDLC-like framing fields with an address field normally carrying a constant value for frames on the ADSL link, the data frame including a signaling indicator in a protocol field specified for PPP protocol identification functions and additional data indicating that the data frame carries a second session identifier identifying the second PPP session, so that the first end station is enabled to include the second session identifier in the address field of data frames on the ADSL link formatted according to the PPP;

detecting in the first intermediate device data frames on the ADSL link formatted according to the PPP, comprising a code in the address field corresponding to the second session identifier; and forwarding data from said data frames including the second session identifier in the session to the third end station.

14. In a system including a network having one or more intermediate devices coupled to end stations by respective links, including a first end station coupled across a link through a first intermediate device to the network, a method for enabling the first end station to establish point-to-point session according to a communication protocol to more than one other end station, comprising:

signaling on the link the first intermediate device to set up a point-to-point session for carrying data frames formatted according to the communication protocol between the first end station and a second end station, the data frames including a reserved field, and including an indicator in the reserved field that a data frame includes a request to establish a session;

receiving a data frame from the first intermediate device including a session identifier for the session; and sending data frames formatted according to the communication protocol including the session identifier to enable the first intermediate device to forward data from the data frame to the second end station in the session.

15. The method of claim 14, wherein the communication protocol comprises a Point-to-Point Protocol PPP.

16. The method of claim 14, wherein the data frames include a reserved field, and said signaling includes sending a data frame to the intermediate device from the first end station including an indicator in the reserved field that the data frame includes a request to establish the session.

17. The method of claim 14, wherein the reserved field comprises a protocol field specified for PPP protocol identification functions.

18. The method of claim 14, wherein the reserved field comprises a protocol field specified for PPP protocol identification functions, carrying a signaling channel code and a following field carrying the session identifier.

19. The method of claim 14, wherein data frames formatted according to the communication protocol include a framing field, and in the sending step, the session identifier comprises a code in the framing field.

20. The method of claim 19, wherein the data frames comprise HDLC-like framing fields including an address field normally carrying a constant value for frames on the link, and wherein the session identifier comprises a code in the address field.

21. The method of claim 14, wherein the communication protocol comprises a Point-to-Point Protocol PPP, and the data frames comprise HDLC-like framing fields including an address field normally carrying a constant value for frames on the link, and said signaling includes sending a data frame to the intermediate device from the first end station including a signaling indicator in a protocol field specified for PPP protocol identification functions and the reserved field indicating that the data frame includes a request to establish the session.

22. The method of claim 14, further including:

signaling on the link the first intermediate device to set up a second point-to-point session for carrying data frames formatted according to the communication protocol between the first end station and a third end station;

receiving a data frame from the first intermediate device including a second session identifier for the second session; and sending data frames formatted according to the communication protocol including the second session identifier to enable the first intermediate device to forward the data frame to the third end station in the second session.

23. In a system including a network having one or more intermediate devices coupled to end stations by respective links, including a first end station coupled across an asynchronous digital subscriber loop ADSL link through a first intermediate device to the network, a method for enabling the first end station to establish point-to-point sessions according to a Point-to-Point Protocol PPP to more than one other end station, comprising:

signaling on the ADSL link the first intermediate device to set up a point-to-point session for carrying data frames formatted according to the PPP between the first end station and a second end station, the data frames comprising HDLC-like framing fields including an address field normally carrying a constant value for frames on the ADSL link, and said signaling includes sending a data frame to the intermediate device from the first end station including a signaling indicator in a protocol field specified for PPP protocol identification functions and additional data indicating that the data frame includes a request to establish a session;

receiving a data frame from the first intermediate device including a signaling indicator in a protocol field specified for PPP protocol identification functions and additional data indicating that the data frame includes a session identifier and including the session identifier; and sending data frames formatted according to the PPP including the session identifier in the address field of the HDLC-like framing fields, to enable the first intermediate device to forward data from the data frame to the second end station in the session.

24. The method of claim 23, including:

signaling on the ADSL link the first intermediate device to set up a second point-to-point session for carrying data frames formatted according to the PPP between the first end station and a third end station, the data frames comprising HDLC-like framing fields including an address field normally carrying a constant value for frames on the ADSL link, said signaling including sending a data frame to the intermediate device from the first end station including a signaling indicator in a protocol field specified for PPP protocol identification functions and additional data indicating that the data frame includes a request to establish a session;

receiving a data frame from the first intermediate device including a signaling indicator in a protocol field specified for PPP protocol identification functions and additional data indicating that the data frame includes a session identifier and including the second session identifier; and sending data frames formatted according to the PPP including the second session identifier in the address field of the HDLC-like framing fields, to enable the first intermediate device to forward data from the data frame to the third end station in the second session.

* * * * *